United States Patent [19]

Bruzzi et al.

[11] Patent Number: 4,778,597
[45] Date of Patent: Oct. 18, 1988

[54] PROCESS FOR THE SEPARATION AND RECOVERY OF BORON COMPOUNDS FROM A GEOTHERMAL BRINE

[75] Inventors: Vittorio Bruzzi; Angelo Bellini, both of Milan, Italy

[73] Assignee: Enichem ANIC S.p.A., Palermo, Italy

[21] Appl. No.: 133,317

[22] Filed: Dec. 16, 1987

[30] Foreign Application Priority Data

Dec. 18, 1986 [IT] Italy .............................. 22746 A/86

[51] Int. Cl.$^4$ ............................................. B01D 13/00
[52] U.S. Cl. ................................... 210/644; 210/195.2
[58] Field of Search ............... 210/644, 649, 650, 651, 210/652, 195.2; 423/276

[56] References Cited

U.S. PATENT DOCUMENTS 3,350,292 10/1967 Weinberger et al. ............ 210/644 X
4,392,959 7/1983 Coillet .............................. 210/651 X Primary Examiner—Frank Spear
Attorney, Agent, or Firm—Hedman, Gibson, Costigan & Hoare

[57] ABSTRACT

Boron compounds are separated and recovered from a geothermal brine, which additionally contains inorganic salts, such as sodium and potassium chlorides and sulphates, by means of a process comprising the following process steps:

(a) pre-concentration of the geothermal brine by expansion up to room pressure, to a pressure lower than room pressure;
(b) concentration of the pre-concentrated brine, coming from the (a) step, by means of an osmotic treatment against a concentrated aqueous solution of recycled inorganic salts;
(c) treatment of crystallization of the concentrated brine, coming from the (b) step, with the separation of the solid inorganic salts from an aqueous solution of boron compounds;
(d) recycle of the inorganic salts separated in the (c) step, to the (b) step of osmosis, in the form of a concentrated aqueous solution; and
(e) recovery of boron compounds from the relevant aqueous solution obtained in the (c) step.

6 Claims, 1 Drawing Sheet

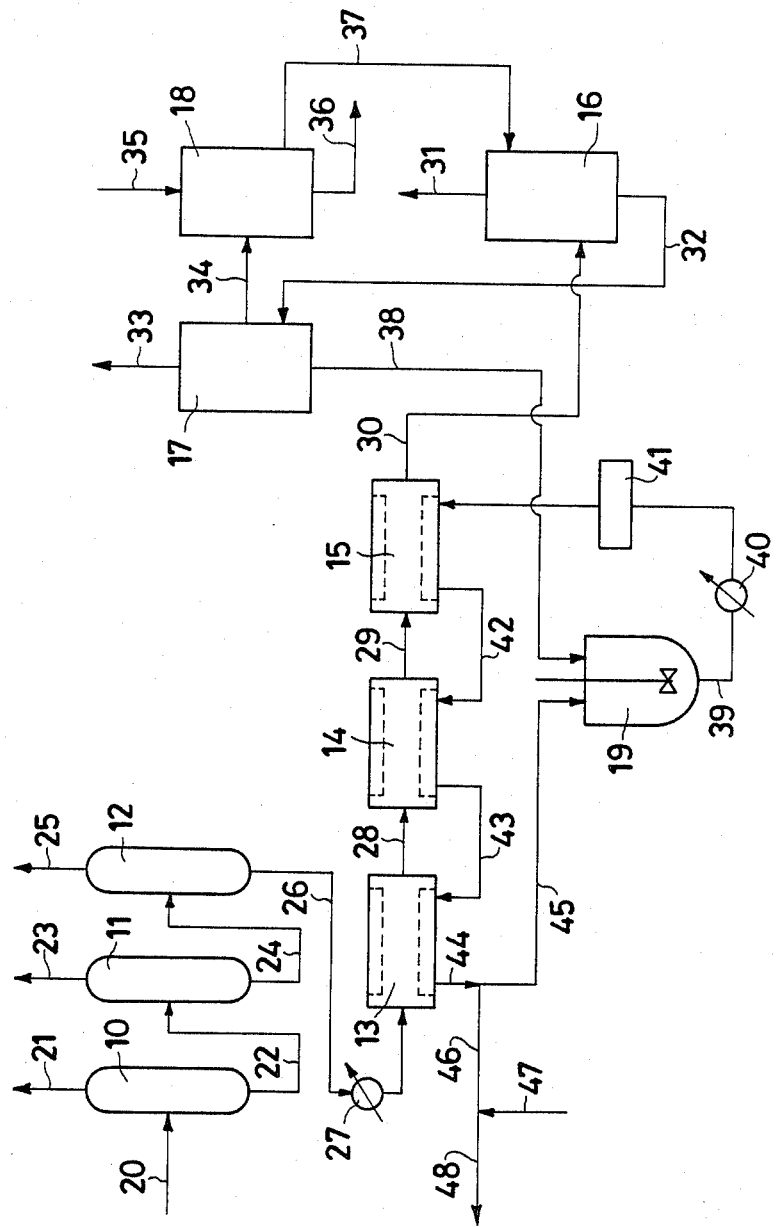

PROCESS FOR THE SEPARATION AND RECOVERY OF BORON COMPOUNDS FROM A GEOTHERMAL BRINE

The present invention relates to a process for the separation and recovery of boron compounds from a geothermal brine which contains said boron compounds together with inorganic salts.

The compounds of boron are products which are widely used in the art.

For example, boric acid constitutes the raw material for the production of boric oxide, useful in particular in the fields of glass, ceramics and enamels. A certain number of chemical products, such as, e.g., inorganic borate salts, boron phosphate, fluoborates, borate esters and metal alloys, such as iron-boron alloys, are prepared by starting from boric acid. Other uses derive from the bactericide and fungicide characteristics of boric acid.

Boric acid is mostly obtained in the art by means of the treatment of inorganic borates (in particular, sodium or calcium borate) with aqueous sulphuric acid, followed by the separation of the acid from the relevant solution, such as disclosed, e.g., by K.A.L.G. Watt in World Minerals and Metals, No. 12, British Sulphur Corp., Lt., 1973, pages 5–12.

According to another technique known from the prior art, a brine containing an alkaline borate is submitted to liquid/liquid extraction with a solution of a kelating aromatic diol in kerosene or in another suitable organic solvent. In this way, an organic phase enriched in the alkaline metal salt of diol-borate complex is separated, and said organic phase is submitted to the treatments of solvent recovery, of transformation of the borate salt into boric acid, and of separation and purification of the same acid. As relates to this technique known from the prior art, reference is made to the disclosure of U.S. Pat. Nos. 2,969,275; 3,424,563; 3,479,294; and 3,493,349.

The processes using borate salts as the raw material in the preparation of boric acid are generally burdensome and yeld a boric acid which must be thoroughly purified in order to be rendered useful in the above reported applications.

Another possible source of boric acid and borate salts is constituted by those geothermal brines, which contain boron compounds together with inorganic salts, in particular, sodium and potassium chlorides and sulphates. However, the commercial exploitation of said geothermal brines has not been meaningful up to date, in particular due to the large energy amounts which are required to recover the boron compounds, which present in rather low concentrations.

The purpose of the present invention is overcoming this state of the art by means of a simple and economically favourable process, which makes it possible to recover, from a geothermal brine, boron compounds at a good purity level.

More particularly, according to the present invention, compounds of boron are recovered from a geothermal brine, which contains said boron compounds together with inorganic salts, such as sodium and potassium chlorides and sulphates, by means of a process comprising the following steps:

(a) pre-concentration of the geothermal brine by expansion up to room pressure, or to a pressure lower than room pressure;

(b) concentration of the pre-concentrated brine, coming from the (a) step, by means of a treatment of osmosis against a concentrated aqeos solution of recycled inorganic salts;

(c) treatment of crystallization of the concentrated brine, coming from the (b) step, with the separation of the solid inorganic salts from an aqueous solution of the boron compounds;

(d) recycle of the inorganic salts separated in the (c) step, to the (b) step of osmosis, in the form of a concentrated aqueous solution; and (e) recovery of boron compounds from the relevant aqueous solution obtained in the (c) step.

A typical geothermal brine is available from natural sources at a high temperature (approximately 190° C.) and under a high pressure (approximately 20 kg/cm$^2$), and contains approximately 1% by weight of boron compounds (expressed as boric acid), and approximately 7% by weight of inorganic salts, mostly constituted by sodium and potassium chlorides and sulphates.

Such a geothermal brine, or similar geothermal brines, are treated, according to the process of the present invention, in order to separate and recover the boron compounds which are contained in them.

In the present disclosure by "inorganic salts", the compounds contained in the geothermal brine, different from boron compounds, are meant. Furthermore, unless otherwise indicated, boron compounds will be expressed as boric acid, and their concentration will be expressed as % by weight of boric acid. In a similar way, by the term "salinity", the concentration of the "inorganic salts" in the brine, or in the relevant aqueous solutions, expressed as % by weight, will be indicated.

The (a) Step

In this step, the geothermal brine is preconcentrated by expansion down to room pressure, or to a lower than room pressure.

In the preferred form of practical embodiment, the expansion is carried out adiabatically in a plurality of evaporators connected in series with each other.

In case of a geothermal brine having the above-indicated typical characteristics, it is possible to carry out the adiabatic expansion inside three evaporators connected in series to each other, to produce a pre-concentrated brine, at a temperature of the order of 40°–50° C., with a salinity of the order of 9%.

The (b) Step

According to the process of the present invention, the pre-concentrated brine, coming from the (a) step, is concentrated by an osmotic treatment carried out against a concentrated aqueous solution of the inorganic salts, contained in the same brine, and recycled from a subsequent process step.

By "osmotic treatment", the transport is meant of a fluid, through a membrane separating two solutions at different activities of the solvent, with a consequent flow, in our specific case, of the aqueous solvent, under the influence of the osmotic gradient, from the more diluted solution (the pre-concentrated brine) to the more concentrated solution (the aqueous solution of the recycled inorganic salts).

The suitable membranes for the intended purpose are semi-permeable membranes capable of swelling, comprising the membranes of cellulose nitrate, cellulose acetate and cellophane (regenerated cellulose from xanthate), or membranes of a non-swelling type, which comprise the membranes of polyvinyl alcohol and polychloro-trifluoroethylene.

In the preferred form of practical embodiment, a plurality of osmosis modules, e.g., three modules, are used, which are connected in series to each other, and are equipped with a semi-permeable membrane of cellulose acetate; and the osmotic treatment is carried out at 30°–50° C., with the pre-concentrated geothermal brine being fed in counter-current relatively to the aqueos solution of the inorganic salts.

Typically, this latter will have an inlet value of salinity of the order of 35%, and an outlet value of salinity of the order of 15%.

By operating under these conditions, from the (b) step of the process of the present invention, a concentrated brine is discharged, which has a salinity value typically of the order of 18%.

The (c) Step

According to the process of the present invention, the concentrated brine coming from the (b) step is submitted to treatments of further concentration and of crystallization, in order to separate the inorganic salts.

According to a preferred form of practical embodiment, this process step is carried out firstly inside an evaporated under a slightly reduced pressure, e.g., under 0.5 atmospheres, and at a temperature of the order of 85° C., to obtain a pulp, and said pulp is then treated inside a crystallizer operating under the atmospheric pressure, and at a temperature of the order of 110° C., to separate the solid inorganic salts from an aqueous solution of the boron compounds.

The (d) Step

The inorganic salts, separated in the above (c) step, are used, according to the process of the present invention, to prepare the concentrated aqueous solution of the same salts, to be used in the (b) step of osmosis.

To that end, according to a preferred form of practical embodiment, the separated inorganic salts are dissolved in the diluted aqueous solution of the same salts, partially recycled from the (b) step of osmosis.

The (e) Step

The crystallization mother liquors coming from the (c) step are constituted by an aqueous solution of boron compounds and, according to the present invention, they are submitted to a crystallization in order to recovery the same compounds. To that end, the crystallization is suitably carried out inside a vacuum crystalllizer and typically under a vacuum of 50 torr, and at a temperature of the order of 40°–50° C.

In this way, the boron compounds are recovered with good characteristics of purity, and with a high yield.

If required, or desired, the diluted aqueous solution of the inorganic salts discharged from the (b) step of osmosis can be added to the geothermal well, possibly after the addition of the condensate water discharged in the various process steps.

EXAMPLE

The equipment is used, which is schematically shown in FIGURE of the hereto attached drawing table.

In said FIGURE, by the reference numerals (10), (11) and (12), three adiabatic evaporators, and by the reference numerals (13), (14) and (15) three modules for osmosis, connected in series to each other, operating in countercurrent and provided with a semipermeable membrane of cellulose acetate, are indicated.

Furthermore, by the reference numerals (16), an evaporator operating under vacuum; (17), a crystallizer operating under atmospheric pressure; and (18), a crystallizer operating under vacuum, are indicated.

To the evaporator (10), through the line (20), 200 parts by weight per hour are fed of a geothermal brine, at the temperature of approximately 190° C. and under the pressure of approximately 20 kg/cm$^2$, containing about 1% by weight of boron compounds (expressed as boric acid) and with a salinity of 7% (by "salinity", the percentage by weight of the inorganic salts different from boron compounds, and essentially constituted by sodium and potassium sulphates being meant).

In the evaporator (10), 22 parts by weight per hour of water vapour are evaporated, and are discharged through the line (21), and a brine is recovered, through the line (22), at the temperature of about 130° C. In the evaporator (11), 17 parts by weight per hour of water vapour are evaporated, and are discharged through the line (23), and a brine is recovered, through the line (24), at the temperature of about 70° C.

In the evaporator (12), 5 parts by weight per hour of water vapour are evaporated, and are discharged through the line (25), and a pre-concentrated brine is recovered, through the line (26), at approximately 50° C.

Said pre-concentrated brine is cooled to about 40° C. inside the heat exchanger (27) and is sent to the osmotic treatment.

In particular, to the osmosis module (13), 156 parts by weight per hour of pre-concentrated brine with a salinity of 9% are fed, and 130 parts by weight per hour of brine with a salinity of 10.8% are discharged through the line (28), and are sent to the osmosis module (14). From the osmosis module (14), 104 parts by weight per hour of a brine with a salinity of 13.5% are discharged through the line (29), and are sent to the osmosis module (15). From the osmosis module (15), 78 parts by weight per hour of a concentrated brine with a salinity of 17.9% are discharged through the line (30).

The osmosis is carried out against an aqueous solution of the inorganic salts, flowing contercurrently to the brine. More particularly, to the osmosis module (15), through the line (39), 60 parts by weight per hour are fed of an aqueous solution of the inorganic salts, which has a salinity of 35%, and through the line (42), 86 parts by weight per hour of an aqueous solution of the inorganic salts with a salinity of 24.4% are discharged, and are sent to the osmosis module (14). From the osmosis module (14) through the line (43), 112 parts by weight per hour of an aqueous solution of the inorganic salts, with a salinity of 18.7%, are discharged, and are sent to the osmosis module (13). From the osmosis module (13), through the line (44), 138 parts by weight per hour are discharged of an aqueous solution of the inorganic salts, with a salinity of 15.2%. This latter solution is partially removed from the system, 92 parts by weight per hour, through the line (46), and is charged to the geothermal well through the line (48), after the preliminary addition of approximately 106 parts by weight per hour of condensate water, fed through the line (47). The residual portion of the solution, 46 parts by weight per hour, is recycled through the line (45).

The concentrated brine discharged from the osmosis module (15) is sent, through the line (30), to the evaporator (16), operating at 85° C. and under 0.5 atmospheres, inside which 42 parts by weight per hour of water are evaporated, and are discharged through the line (31), and a pulp is formed, which is sent, through the line (32), to the crystallizer (17), operating under atmospheric pressure, and at the temperature of 110° C. In the evaporator (17), 30 parts by weight per hour of water vapour are evaporated and are discharged through the line (33), and 14 parts by weight per hour of solid inorganic salts are separated from an aqueous solutions of boron compounds, saturated with inorganic salts. The solid inorganic salts separated in the crystallizer (17) are transferred, through the line (38), to the stirred vessel (19), to which 46 parts by weight per hour of a recycled aqueous solution, with a salinity of 15.2%, coming from the osmosis module (13), are fed.

In the vessel (19), the aqueous solution of the inorganic salts with a salinity of 35% is formed, and is fed to the osmosis module (15) at a flow rate of 60 parts by weight per hour, after being previously adjusted in temperature at about 40° C. in the heat exchanger (40), and filtered in filter (41).

The aqueous solution of boron compounds is transferred, through the line (34), from the crystallizer (17) to the crystallizer (18), to which also 10 parts by weight of water are fed through the line (35). Inside the crystallizer (18), the crystallization is carried out under 50 torr and at a temperature of from 40° to 50° C., and, through the line (36), 2 parts by weight per hour of solid boron compounds are discharged, and, through the line (37), 10 parts by weight per hour of crystallization mother liquors are discharged, and are recycled to the evaporator (16) through the line (37).

We claim:

1. Process for the separation and recovery of boron compounds from a geothermal brine, which contains said boron compounds together with inorganic salts, in particular, sodium and potassium chlorides and sulphates, characterized in that it comprises the following process steps:
   (a) pre-concentration of the geothermal brine by expansion up to room pressure, to to a pressure lower than room pressure;
   (b) concentration of the pre-concentrated geothermal brine, coming from the (a) step, by means of a treatment of osmosis against a concentrated aqueous solution of recycled inorganic salts;
   (c) treatment of crystallization of the concentrated brine, coming from the (b) step, with the separation of the solid inorganic salts from an aqueous solution of the boron compounds;
   (d) recycle of the inorganic salts separated in the (c) step, to the (b) step of osmosis, in the form of a concentrated aqueous solution; and
   (e) recovery of boron compounds from the relevant aqueous solution obtained in the (c) step.

2. Process according to claim 1, characterized in that the geothermal brine is at a temperature of approximately 190° C., and under a pressure of approximately 20 kg/cm$^2$, and contains about 1% by weight of boron compounds, expressed as boric acid, and approximately 7% by weight of inorganic salts.

3. Process according to claim 1, characterized in that in the (a) step the pre-concentration is carried out by operating in three adiabatic evaporators connected in series with each other, with an expansion up to the atmospheric pressure, or at a pressure approximately equal to the atmospheric pressure, and with a pre-concentrated brine being obtained, which has a temperature of 40°–50° C., and a content of inorganic acids of the order of 9% by weight.

4. Process according to claim 1, characterized in that in the (b) step the concentration is carried out with three osmosis modules connected in series with each other, equipped with a semi-permeable membrane of cellulose acetate, at a temperature of 30°–50° C., by countercurrently feeding the pre-concentrated brine and an aqueous solution containing approximately 35% by weight of inorganic salts, and a concentrated brine, which contains approximately 18% by weight of inorganic salts, and an aqueous solution containing approximately 15% by weight of inorganic salts, are discharged.

5. Process according to claim 1, characterized in that the brine concentrated in the osmosis (b) step, is submitted firstly to an evaporation in an evaporator operating at approximately 85° C. and under 0.5 atmospheres, to obtain a pulp, and then to a crystallization in a crystallizer operating at about 110° C., and under the atmospheric pressure, with the separation of the inorganic salts.

6. Process according to claim 1, characterized in that in the (c) step the treatment is carried out in a crystallizer at 40°–50° C., and under approximately 50 torr.

* * * * *